(12) United States Patent
Miyashita (10) Patent No.: US 7,455,341 B2
(45) Date of Patent: Nov. 25, 2008

(54) AUTOMOTIVE CONTAINER HOLDING APPARATUS

(75) Inventor: Tatsuki Miyashita, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 414 days.

(21) Appl. No.: 11/289,041

(22) Filed: Nov. 29, 2005

(65) Prior Publication Data

US 2006/0113311 A1    Jun. 1, 2006

(30) Foreign Application Priority Data

Nov. 30, 2004    (JP)    ............................ 2004-347335

(51) Int. Cl.
*B60N 3/10*    (2006.01)
*B60R 7/06*    (2006.01)
*B60N 3/12*    (2006.01)

(52) U.S. Cl. .................. 296/37.12; 220/8; 220/345.4; 224/281; 224/926; 248/421

(58) Field of Classification Search ................ 74/469; 108/72; 220/8, 345.1, 345.2, 345.3, 345.4; 224/281, 548, 549, 552, 926; 248/311.2, 248/421; 296/37.8, 37.12; 312/306, 312, 312/334.2, 334.3; D12/419, 420
See application file for complete search history.

(56) References Cited

U.S. PATENT DOCUMENTS

| | | | | |
|---|---|---|---|---|
| 4,583,707 A | * | 4/1986 | Anderson | ............... 248/292.13 |
| 4,759,584 A | * | 7/1988 | Dykstra et al. | ......... 297/188.16 |
| D328,730 S | * | 8/1992 | Kapp | ........................ D12/419 |
| 5,454,537 A | * | 10/1995 | Meeker et al. | ........... 248/220.1 |
| 5,634,621 A | * | 6/1997 | Jankovic | .................. 248/311.2 |
| 5,997,092 A | * | 12/1999 | Slaven | .................... 297/411.36 |
| 6,685,152 B2 | * | 2/2004 | Shirase et al. | ............ 248/311.2 |
| 6,834,838 B2 | * | 12/2004 | Dennis et al. | ............ 248/311.2 |
| 2001/0030217 A1 | * | 10/2001 | Corrion et al. | .............. 224/926 |
| 2005/0269472 A1 | * | 12/2005 | Wagner et al. | ........... 248/311.2 |
| 2006/0278790 A1 | * | 12/2006 | Park | ........................ 248/311.2 |

FOREIGN PATENT DOCUMENTS

| | | |
|---|---|---|
| JP | 62-195538 | 12/1987 |
| JP | 63-39045 | 3/1988 |
| JP | 63-75440 | 5/1988 |
| JP | 03292228 A * | 12/1991 |
| JP | 9-226434 | 9/1997 |
| JP | 2004-217145 | 8/2004 |
| JP | 2005-112248 | 4/2005 |

* cited by examiner

*Primary Examiner*—D. Glenn Dayoan
*Assistant Examiner*—Paul A Chenevert
(74) *Attorney, Agent, or Firm*—Rankin, Hill & Clark LLP

(57) ABSTRACT

An automotive container holding apparatus having a holding portion (51) which holds a bottom (Ca) of a drink container (C), and erect wall portions (61, 62, 64) which are provided at sides of the holding portion (51) in such a manner as to face sides Cb(Cb) of the container (C), wherein the holding portion (51) and the erect wall portions (61, 62, 64) are provided so as to move vertically in such a manner that the erect wall portions (61, 62, 64) move upwards in such a manner as to link with a downward movement of the holding portion (51).

5 Claims, 10 Drawing Sheets

AUTOMOTIVE CONTAINER HOLDING APPARATUS

BACKGROUND OF THE INVENTION

The present invention relates to an automotive container holding apparatus which holds stably a container such as a drink container.

As to an automotive container holding apparatus which holds stably a drink container or a so-called cup holder, there exists an automotive container holding apparatus in which partitioning walls are provided in a recess-shaped article storing compartment in such a manner as to erect, so that a drink container is held by the partitioning walls and erect wall portions of the article storing compartment (refer, for example, to Japanese Document JP-A-2004-217145). In this automotive container holding apparatus, when it is necessary to hold a drink container in the article storing compartment, part of the storing space of the article storing compartment is constructed to be used to hold the drink container, whereas when it becomes unnecessary to do so, the storing space of the article storing compartment can be increased or restored by collapsing the partitioning walls.

With the aforesaid automotive container holding apparatus, the height of the erect wall portions is not sufficient to hold a tall drink container, and hence the drink container projects upwards largely from the erect wall portions, resulting in a possibility that the drink container cannot be held in a stable fashion. Then, to cope with this, in the event that the height of the erect wall portions is increased, the ingress and egress of an article into and from the article storing compartment becomes difficult when attempting to use the whole of the same compartment for storage of the article.

SUMMARY OF THE INVENTION

Consequently, an object of the invention is to provide an automotive container holding apparatus which can not only hold stably a tall container but also maintain the height of the erect wall portions low in such a state that no container is held.

With a view to attaining the object, according to a first aspect of the invention, there is provided with an automotive container holding apparatus including: a holding portion which holds a bottom of a container, and erect wall portions which are provided at sides of the holding portion to face sides of the container, wherein the holding portion and the erect wall portions are provided to move vertically, and the erect wall portions move upwards while linking with a downward movement of the holding portion.

According to a second aspect of the invention, there is provided with the automotive container holding apparatus as set forth in the first aspect of the invention, wherein an upper surface (for example, upper surfaces 60a, 122a of the embodiments) of the holding portion becomes flush with upper surfaces (for example, upper surfaces 51e, 13e of the embodiments) of the erect wall portions in a state that the holding portion has moved upwards and the erect wall portions have moved downwards.

According to a third aspect of the invention, there is provided with the automotive container holding apparatus as set forth in the first or second aspect of the invention, further including: a substantially V-shaped connecting member that is provided in such a manner as to be connected to the holding portion at one end thereof and to be connected to the erect wall portion at the other end thereof and to rotate at an intermediate portion thereof where the connecting member is bent.

According to a fourth aspect of the invention, there is provided with the automotive container holding apparatus as set forth in any of the first to third aspects of the invention, further including: a recess-shaped article storing compartment which opens upwards, wherein the holding portion is provided to be closer to one of oppositely facing side wall portions of the article storing compartment in such a manner as to be farther away from the other of the oppositely facing side wall portions, and the erect wall portion for the holding portion in the article storing compartment is provided at least at the side of the other of the oppositely facing side wall portions.

According to the first aspect of the invention, since, when the holding portion that is to hold a bottom of a container is caused to move downward in an attempt to hold a container, the erect wall portions that can face the sides of a container move upwards in such a manner as to link with the downward movement of the holding portion, the erect wall portions that have so moved can compensate for insufficient height thereof to hold stably a tall container, thereby making it possible to hold stably a tall container. In addition, in such a state that no container is held, when the erect wall portions are caused to move downwards, the height of the erect wall portions can be maintained low. In addition, since the erect wall portions move upwards in such a manner as to link with the downward movement of the holding portion, the erect wall portions can be caused to move upwards so as to hold a tall container stably only by lowering the holding portion with the container placed on the holding portion. In addition, since the erect wall portions move upwards by lowering the holding portion, a small article that is put aside can be prevented from falling on to the side of the holding portion which has moved downwards by the erect wall portions.

According to the second aspect of the invention, since, when causing the holding portion to move upwards while lowering the erect wall portions, the upper surface of the holding portion becomes flush with the upper surfaces of the erect wall portions, the external appearance characteristic of the automotive container holding apparatus can be improved when in a non-use state with no container held therein.

According to the third aspect of the invention, since the erect wall portions can be caused to move upwards in such a manner as to link with the downward movement of the holding portion by means of the substantially V-shaped connecting member that is provided in such a manner as to be connected to the holding portion at one end and to the erect wall portion at the other end thereof and to rotate at the intermediate portion thereof where the connecting member is bent, the construction of the automotive container holding apparatus can be made simple, and the area of the holding portion can be obtained widely.

According to the fourth aspect of the invention, when the holding portion is lowered which is provided close to the side wall portion of the article storing compartment which oppositely faces the other side wall portion thereof in such a manner as to be spaced away from the other side wall portion, the erect wall portion moves upwards which is provided at least on the side of the holding portion which faces the other side wall portion of the article storing compartment, so that a state is produced where a container can be held stably by means of the one side wall portion of the article storing compartment and the erect wall portion. As this occurs, the remaining space of the article storing compartment which is situated on the other side wall portion side of the article storing compartment can be used for a storing space for other articles than the container. In addition, with no container held, when the erect wall portion is caused to move downwards, the whole of the article storing compartment can be used widely as a storing space. In addition, since the side wall portion of the article storing compartment is used to hold the container, the construction of the automotive container apparatus can made simpler, and moreover, the space for the erect wall portions can be saved, thereby making it possible to expand the storing space.

DETAILED DESCRIPTION OF THE PREFERRED EMBODIMENTS

An automotive container holding apparatus according to a first embodiment of the invention will be described below by reference to FIGS. 1 to 5.

Figure 1:
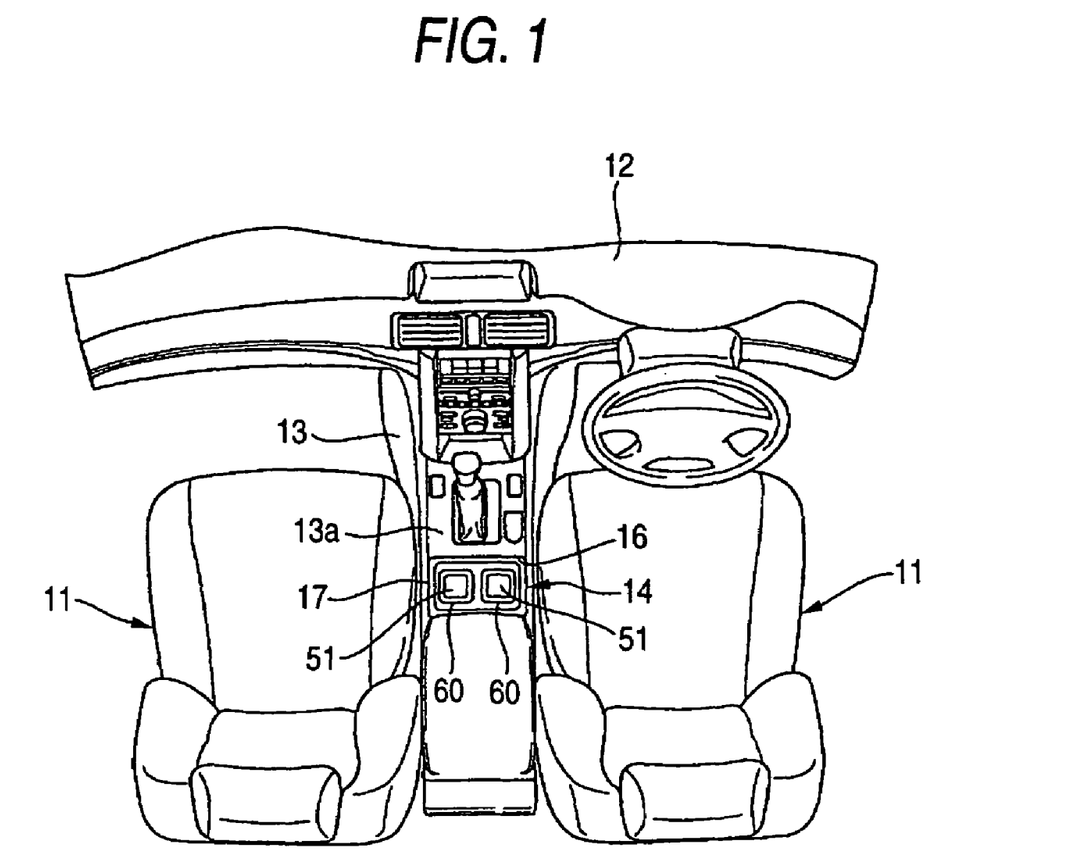
FIG. 1 is a plan view which shows the inside of a passenger compartment of a vehicle in which an automotive container holding apparatus according to a first embodiment of the invention is provided.
Figure 2:
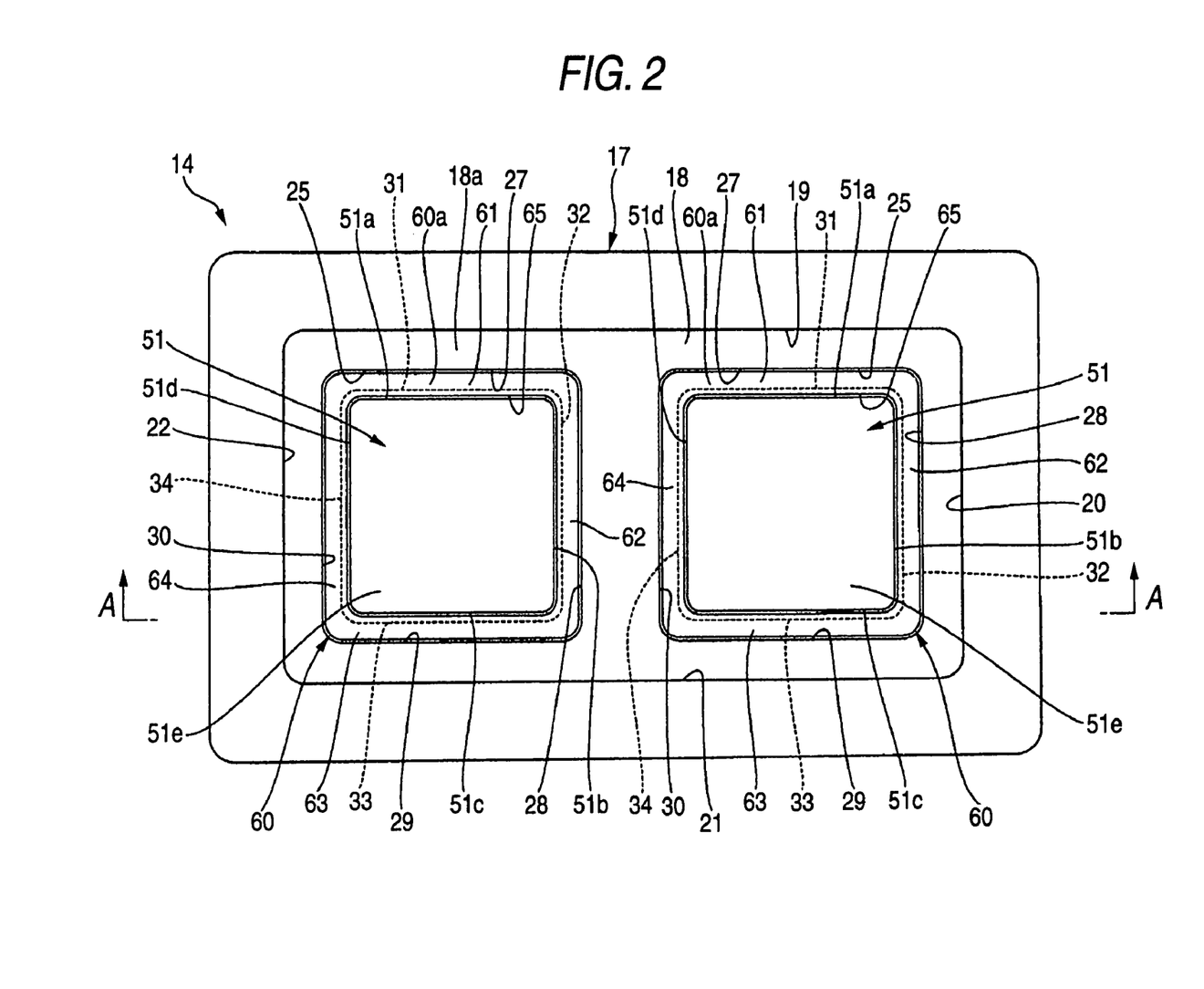
FIG. 2 is a plan view which shows the automotive container holding apparatus according to the first embodiment of the invention.
Figure 3:
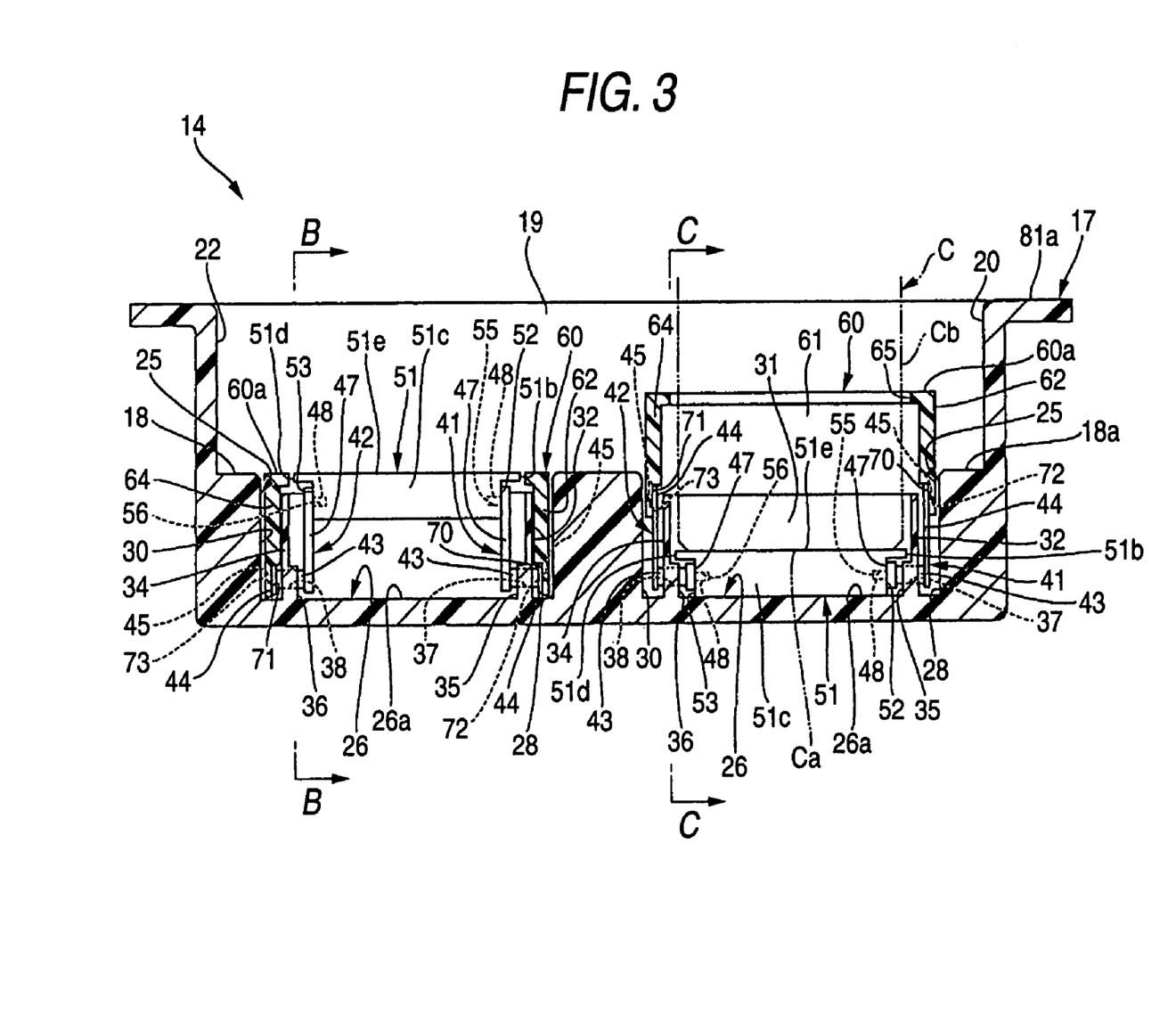
FIG. 3 is a sectional view taken along the line A-A in FIG. 2 which shows the automotive container holding apparatus according to the first embodiment of the invention.

FIG. 1 is a plan view showing the inside of a passenger compartment of a vehicle in which there is provided between front seats 11 arranged in a transverse direction of the vehicle a center console 13 that extends from an instrument panel 12 in a longitudinal direction of the vehicle, and an automotive container holding apparatus 14 of the first embodiment is provided in this center console 13.

The automotive container holding apparatus 14 has a console box portion (an article storing compartment) 17 adapted to be mounted in a transversely elongated mounting hole 16 which is formed in an upper surface 13a of the center console 13.

As is shown in FIGS. 2 to 5, the console box portion 17 is formed into a recess which opens upwards and has a bottom portion 18 that is formed substantially into a transversely elongated, rectangular shape and which is disposed horizontally and four side wall portions 19 to 22 which rise from respective side edge portions of the bottom portion 18 and which are connected to each other in such a manner as to form a frame. In addition, recessed portions 25 are formed at two locations in the bottom portion 18 in such a manner as to recede further downwards from an upper surface of the bottom portion 18 or a bottom surface 18a of the console box portion 17. Note that since the respective recessed portions 25 are constructed in the same way, constructions of respective portions of one of the recessed portions 25 will be described in the following description.

The recessed portion 25 has a bottom portion 26 that is formed substantially into a square shape and which is disposed horizontally, four inner wall portions 27 to 30 which rise, respectively, from respective edge portions of the bottom portion 26 to the bottom surface 18a of the console box portion 17 and which are connected to each other in such a manner as to form a frame and four flat plate-shaped guide wall portions 31 to 34 which rise from the bottom portion 26 inside the respective inner wall portions 27 to 30 and which are connected to each other in such a manner as to form a frame, and projecting portions 35, 36 are formed at central positions of lower portions of, for example, the guide wall portions 32, 34 which face each other in the transverse direction in such a manner as to project in a direction in which they approach each other.

Here, a through hole 37 is formed in the guide wall portion 32 on which the projecting portion 35 is formed at a position thereof where the projecting portion 35 is actually formed, and a through hole 38 is formed in the guide wall portion 34 on which the projecting portion 36 is formed at a position thereof where the projecting portion 36 is actually formed. Note that the height of the guide wall portions 31 to 34 is set lower than the bottom surface 18a of the console box portion 17.

The automotive container holding apparatus 14 has a connecting member 41 that is rotatably supported at the through hole 37 and a connecting portion 42 that is rotatably supported at the through hole 38.

These connecting members 41, 42 include rotational shafts 43 that are formed into the same shape and which are inserted into the corresponding through holes 37, 38, outer connecting arms 44 that are fixed to axial outer end portions of the rotational shafts 43 at proximal end portions thereof in such a state that the outer connecting arms 44 extend radially outwards from the rotational shafts 43, outer support shafts 45 that are provided at distal end portions of the outer connecting arms 44, which are opposite to the proximal end portions thereof where the outer connecting arms 44 are connected to the rotational shafts 43, in such a manner as to project further outwards than the rotational shafts 43 therealong, inner connecting arms 47 that are fixed to axial inner end portions of the rotational shafts 43 at proximal end portions thereof in such a state that the inner connecting arms 47 extend radially outwards from the rotational shafts 43 and inner support shafts 48 that are provided at distal end portions of the inner connecting arms 47, which are opposite to the proximal end portions thereof where the inner connecting arms 47 are connected to the rotational shafts 43, in such a manner as to project further inwards than the rotational shafts 43 therealong.

Figure 4:
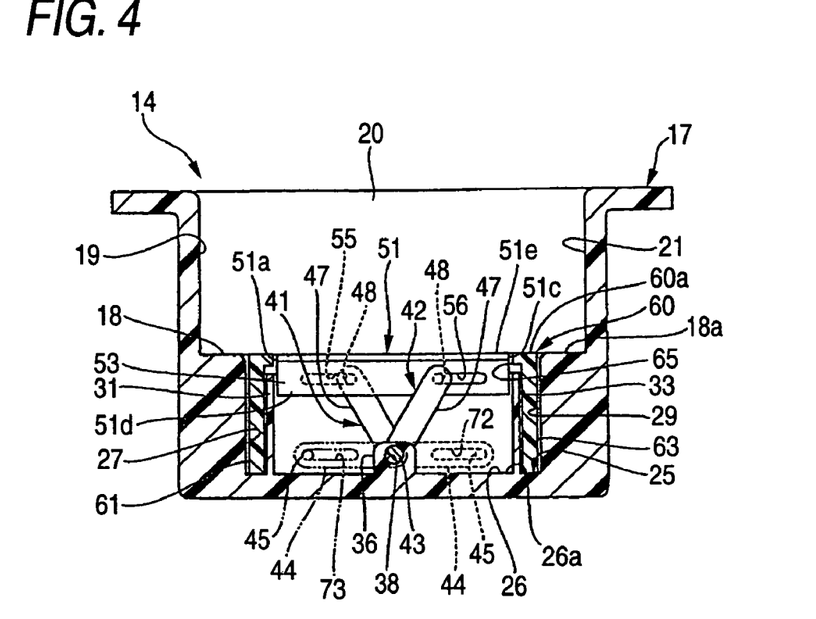
FIG. 4 is a sectional view taken along the line B-B in FIG. 3 which shows the automotive container holding apparatus according to the first embodiment of the invention.

Here, in each of the connecting members 41, 42, as shown in FIG. 4, when viewed along an axial direction of the rotational shaft 43, the outer connecting arm 44 and the inner connecting arm 47 intersect with each other in such a manner as to form an obtuse angle therebetween to thereby form substantially a V-shape and are provided on the console box portion 17 in such a manner as to rotate about the rotational shaft 43 that is provided at an intermediate portion of a bend that is formed by the outer connecting arm 44 and the inner connecting arm 47.

The automotive container holding apparatus 14 has a substantially square plate-shaped holding member (a holding portion) 51 that is horizontally disposed inside a portion surrounded by the frame-shaped guide wall portions 31 to 34 and which is connected to the respective inner support shafts 48 that are provided at the one ends of the connecting members 41, 42. Stepped portions 52, 53, which are each formed into a shape which recedes further inwards at a lower portion than an upper portion, are formed on a pair of oppositely facing side portions 51b, 51d of four side portions 51a to 51d of the holding portion 51 in such a manner as to extend along the full length of the side portions 51b, 51d.

Then, a guide groove 55 is formed in the stepped portion 52 of the side portion 51b in such a manner as to extend horizontally along the stepped portion 52, and a guide groove 56 is also formed in the stepped portion 53 in such a manner as to extend horizontally along the stepped portion 53. These guide grooves 55, 56 are, as shown in FIG. 4, formed so as to be offset outwards from horizontal centers of the stepped portions 52, 53, respectively, while the positions of the guide grooves 55, 56 where they extend horizontally are made to deviate from each other.

In the holding member 51, the inner support shaft 48 of the connecting member 41, which is one of the connecting members, is allowed to be slidably inserted into the guide groove 55, which is one of the guide grooves, whereas the inner support shaft 48 of the other connecting member 42 is allowed to be slidably inserted into the other guide groove 56, and as a result, the holding member 51 is supported by the connecting members 41, 42.

Here, as shown in FIG. 4, when the inner connecting arms 47 of the respective connecting members 41, 42 are put in such a state that they extend obliquely upwards from the rotational shafts 43, the inner support shafts 48 of the respective connecting members 41, 42 are put in such a state that they are situated, respectively, at inner end portions in the corresponding guide grooves 55, 56 as viewed in the direction in which the grooves extend, whereby the holding member is situated at a limit position of an upward motion. As this occurs, an upper surface 51e of the holding member 51 becomes flush with the bottom surface 18a of the console box portion 17.

Figure 5:
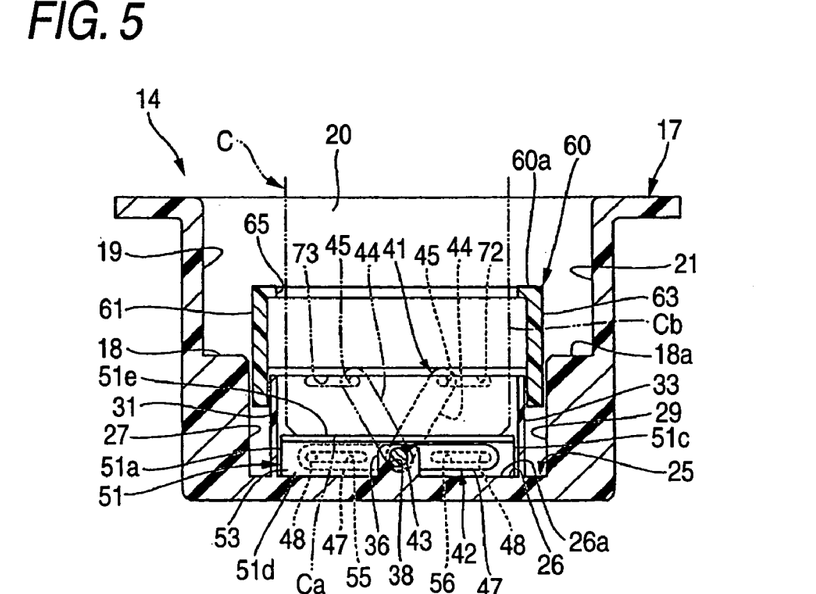
FIG. 5 is a sectional view taken along the line C-C in FIG. 3 which shows the automotive container holding apparatus according to the first embodiment of the invention.

On the other hand, as shown in FIG. 5, when the inner connecting arms 47 of the respective connecting members 41, 42 are put in such a state that they extend horizontally from the rotational shafts 43, the inner support shafts 48 of the respective connecting members 41, 42 are put in such a state that they are situated, respectively, at outer end portions in the corresponding guide grooves 55, 56 as viewed in the direction in which the grooves extend, whereby the holding member is situated at a limit position of a downward motion. As this occurs, the holding member 51 is situated below the bottom surface 18a of the console box portion 17 to be superposed on an upper surface or a bottom surface 26a of the bottom portion 26 of the recessed portion 25. Then, the holding portion 51 is allowed to ascend and descend between the upper and lower limit positions. Namely, the holding member 51 is provided in such a manner as to move in the vertical directions.

The automotive container holding apparatus 14 has an ascending and descending member 60 that is inserted into a frame-shaped gap formed between the four inner wall portions 27 to 30 and the four guide wall portions 31 to 34. This ascending and descending member 60 has four substantially flat plate-shaped erect wall portions 61 to 64 which are connected to each other in such a manner as to form a tube. This ascending and descending member 60 has an annular projecting portion 65 that is formed on upper edge portions of all the erect wall portions in such a manner as to project inwards.

Then, recess-shaped stepped portions 70, 71 are formed on oppositely facing sides of lower portions of the pair of oppositely facing erect wall portions 62, 64 of the ascending and descending member 60 in such a manner as to extend along the full length of the erect wall portions 62, 64, and a guide groove 72 is formed in the stepped portion 70 of the erect wall portion 62 in such a manner as to extend horizontally along the stepped portion 70, whereas a guide groove 73 is formed in the stepped portion 71 of the erect wall portion 64 in such a manner as to extend horizontally along the stepped portion 71. As shown in FIG. 4, these guide grooves 72, 73 are formed in such a manner as to be offset outwards from horizontal centers of the stepped portions 70, 71, respectively, while the positions of the guide grooves 72, 73 where they extend horizontally are made to deviate from each other.

In the ascending and descending member 60, the outer support shaft 45 which is provided at the other end of the connecting member 41, which is one of the connecting members, is allowed to be slidably inserted into the guide groove 72, which is one of the guide grooves, whereas the outer support shaft 45 of the other connecting member 42 is allowed to be slidably inserted into the other guide groove 73, and as a result, the ascending and descending member 60 is connected to the other ends of the connecting members 41, 42 on the erect wall portions 62, 64 where the guide grooves 72, 73 are formed.

Here, as shown in FIG. 5, when the outer connecting arms 44 of the respective connecting members 41, 42 are put in such a state that they extend obliquely upwards from the rotational shafts 43, the outer support shafts 45 of the respective connecting members 41, 42 are put in such a state that they are situated, respectively, at inner end portions in the corresponding guide grooves 72, 73 in the direction in which the grooves extend, whereby the ascending and descending member 60 is situated at a limit position of an upper motion thereof. As this occurs, in the ascending and descending member 60, upper surfaces 60a of the erect wall portions 61 to 64 are situated above the bottom surface 18a of the console box portion 17.

On the other hand, as shown in FIG. 4, when the outer connecting arms 44 of the respective connecting members 41, 42 are put in such a state that they extend horizontally from the rotational shafts 43, the outer support shafts 45 of the respective connecting members 41, 42 are situated, respectively, at outer end portions in the corresponding guide grooves 72, 73 as viewed in the direction in which the grooves extend, whereby the ascending and descending member 60 is situated at a limit position of a downward motion thereof. As this occurs, in the ascending and descending member 60, the upper surfaces 60a of the erect wall portions 61 to 64 become flush with the bottom surface 18a of the console box portion 17. Then, the ascending and descending member 60 is allowed to ascend and descend between the upper and lower limit positions thereof. Namely, the ascending and descending member 60 having the erect wall portions 61 to 64 is provided in such a manner as to move in the vertical directions.

Here, since the connecting members 41, 42 are formed substantially into the V-shape as has been described above and are rotatably provided on the console box portion 17 at the intermediate portions where they are bent, when the inner support shafts 48 move upwards, the outer support shafts 45 move downwards in such a manner as to link with the upward movement of the inner support shafts 48, whereas when the inner support shafts 48 move downwards, the outer support shafts 45 move upwards in such a manner as to link with the downward movement of the inner support shafts 48. As a result, the ascending and descending member 60 that has the erect wall portions 61 to 64 which are connected to the outer support shafts 45 moves upwards in such a manner as to link with a downward movement of the holding member 51 that is connected to the inner support shafts 48, whereas the ascending and descending member 60 that has the erect wall portions 61 to 64 which are connected to the outer support shafts 45 moves downwards in such a manner as to link with an upward movement of the holding member 51 that is connected to the inner support shafts 48.

Then, when the holding member 51 has moved downwards to the lower limit position thereof, the ascending and descending member 60 has moved upwards to the upper limit position thereof. In this state, the holding member 51 is situated below the bottom surface 18a of the console box portion 17, whereas the ascending and descending member 60 is situated above the bottom surface 18a of the console box portion 17.

In addition, when the holding member 51 has moved upwards to the upper limit position thereof, the ascending and descending member 60 has moved downwards to the lower limit position thereof. In this state, the upper surface 51e of the holding member 51 and the upper surfaces 60a of the erect wall portions 61 to 64 of the ascending and descending member 60 become flush with the bottom surface 18a of the console box portion 17.

Here, in a state where only the weights of the holding member 51 and the ascending and descending member 60 are exerted from the relationship between the weights of the holding member 51 and the ascending and descending member 60, the upper surface 51e of the holding member 51 and the upper surfaces 60a of the erect wall portions 61 to 64 of the ascending and descending member 60 become flush with the bottom surface 18a of the console box portion 17, whereby the entirety of a bottom surface 18a side of the console box portion 17 becomes flat to thereby constitute a storing space where an article can be placed. Note that even when an article is placed there, in the event that the article is not placed on the holding member 51 in such a way that a load which is equal to or greater than a predetermined value is exerted only on the upper surface 51e of the holding member 51, the state is maintained in which the upper surface 51e of the holding member 51, the upper surfaces 60a of the erect wall portions 61 to 64 of the ascending and descending member 60 and the bottom surface 18a of the console box portion 17 are flush with each other.

On the other hand, when a drink container (a container) C is placed on the holding member 51, a load that is equal to or greater than the predetermined value is exerted on the upper surface 51e of the holding member 51, whereby the holding member 51 descends until it stops at the limit position of the downward movement thereof, and linking with this downward movement of the holding member 51, the ascending and descending member 60 ascends until it stops at the limit position of the upward movement thereof. As a result, there is produced a state in which the a bottom Ca of the container C is held on the holding member 51, and the guide wall portions 31 to 34 of the recessed portion 25 which extend upwards over the holding member 51 that has so descended and the erect wall portions 61 to 64 of the ascending and descending member 60 which extend upwards over the recessed portion 25 face sides Cb of the drink container C so as to restrict sideways movements of the container C.

The configurations of the respective portions of the recessed portion 25 that have been described heretofore are provided to the other of the two recessed portions 25.

According to the automotive container holding apparatus of the first embodiment that has been described heretofore, since when the holding member 51 which is to hold the bottom Ca of a drink container C is caused to move downwards in an attempt to hold the drink container C, the ascending and descending member 60 having the erect wall portions 61 to 64 which can face the sides Cb of the container C moves upwards in such a manner as to link with the downward movement of the holding member 51, the insufficient height of the erect wall portions 61 to 64 can be compensated for, so that the tall drink container C can be held stably.

In addition, the erect wall portions 61 to 64 of the ascending and descending member 60 are caused to move downwards in such a state that no drink container C is held, and the holding member 51 ascends in such a manner as to link with the downward movement of the erect wall portions 61 to 64, whereby the height of the erect wall portions 61 to 64 can be maintained low. To be specific, the state can be produced in which the upper surfaces 60a of the erect wall portions 61 to 64, the upper surface 51e of the holding member 51 and the bottom surface 18a of the console box portion 17 become flush with each other. Consequently, in a non-use state in which no drink container C is held, not only is the external appearance characteristic of the automotive container holding apparatus 14 improved but also the storing characteristic thereof is enhanced in which an article is placed into the console box portion 17 for storage therein.

In addition, since the ascending and descending member 60 having the erect wall portions 61 to 64 moves upwards in such a manner as to link with a downward movement of the holding member 51, there can be produced a state in which the ascending and descending member 60 having the erect wall portions 61 to 64 can be caused to move upwards only by placing the drink container C on the holding member 51 so as to cause the holding member 51 to be lowered by the weight of the drink container C, so that the tall drink container C can be held stably. Namely, the necessity of a special action such as rotation of the erect wall portions can be obviated.

Furthermore, since the ascending and descending member 60 having the erect wall portions 61 to 64 can be caused to move upwards in such a manner as to link with a downward movement of the holding member 51 by means of the substantially V-shaped connecting members 41, 42 which are provided in such a manner as to be connected to the holding member 51 at the one ends and to the erect wall portions 62, 64 of the ascending and descending member 60 at the other ends thereof and to rotate at the intermediate portions where they are bent, the construction of the automotive container holding apparatus 14 can be made simple, and the area of the holding member 51 can be obtained widely.

In addition, since the erect wall portions 61 to 64 move upwards when the holding member 51 is caused to move downwards, a small article that is placed on the bottom surface 18a of the console box portion 17 can be prevented from falling on to the side of the holding member 51 that has moved downwards.

On top of this, since the ascending and descending member 60 is constructed so as to be easily removed from the connecting members 41, 42, the connecting members 41, 42 are also constructed so as to be easily disassembled and the holding member 51 is also constructed so as to be removed, these members can easily be removed from the console box portion 17, thereby facilitating the implementation of maintenance work.

Note that there may be provided a locking mechanism which is designed to lock the holding member 51 and the ascending and descending member 60 in such a manner as to prohibit the ascending and descending thereof when the holding member 51 comes to be situated at the limit position of the downward movement thereof while the ascending and descending member 60 comes to be situated at the limit position of the upward movement thereof and to release the holding member 51 and the ascending and descending member 60 which are so locked by pushing down the ascending and descending member 60 with a force of a predetermined value or greater. In addition, there may be provided a locking mechanism which is designed to lock the holding member 51 and the ascending and descending member 60 in such a manner as to prohibit the ascending and descending thereof when the holding member 51 comes to be situated at the limit position of the upward movement thereof while the ascending and descending member 60 comes to be situated at the limit position of the downward movement thereof and to release the holding member 51 and the ascending and descending member 60 which are so locked by pushing down the holding member 51 with a force of a predetermined value or greater. Furthermore, both of the locking mechanisms may be provided.

Figure 6:
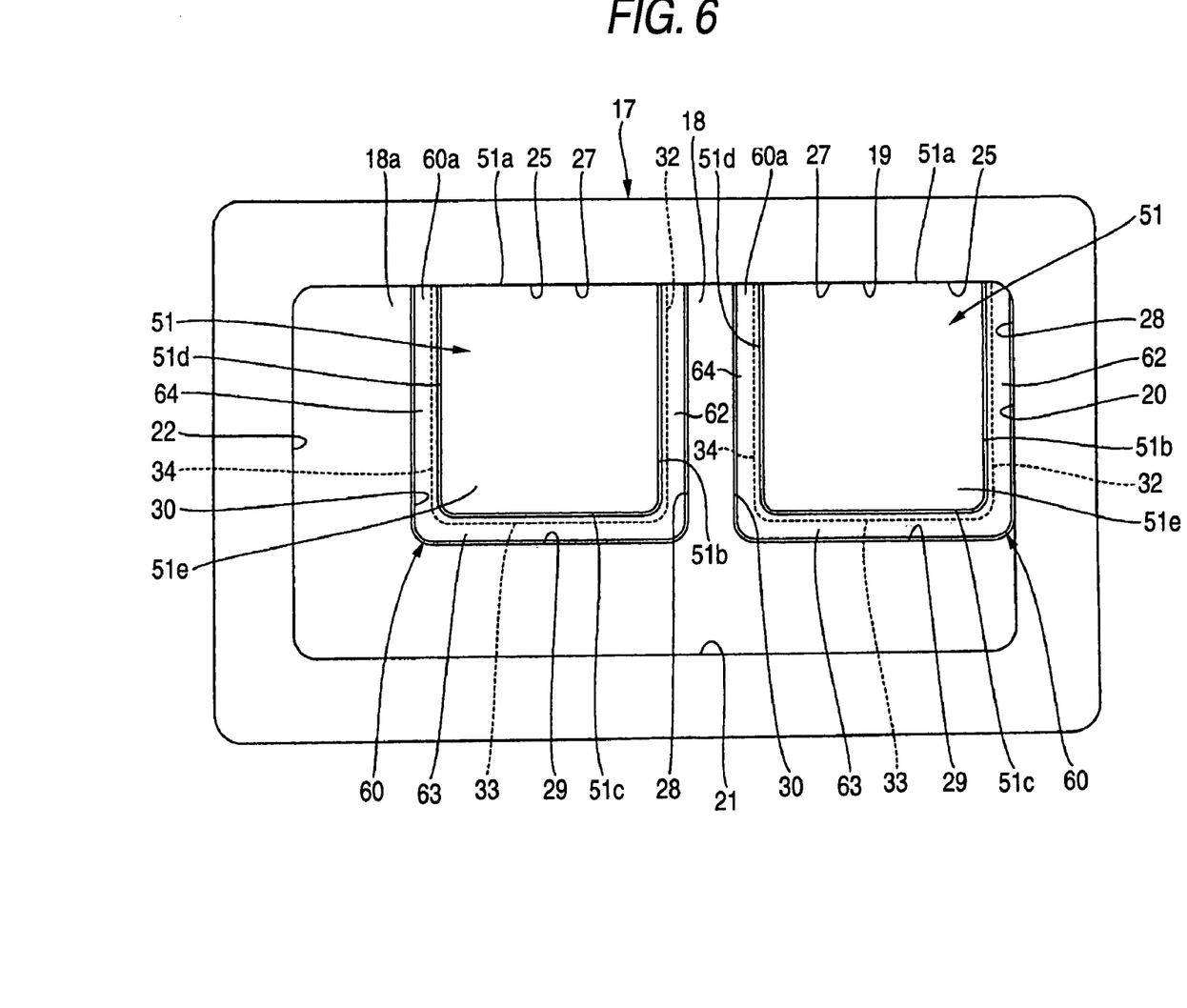
FIG. 6 is a plan view which shows a modified example to the automotive container holding apparatus according to the first embodiment of the invention.
Figure 7:
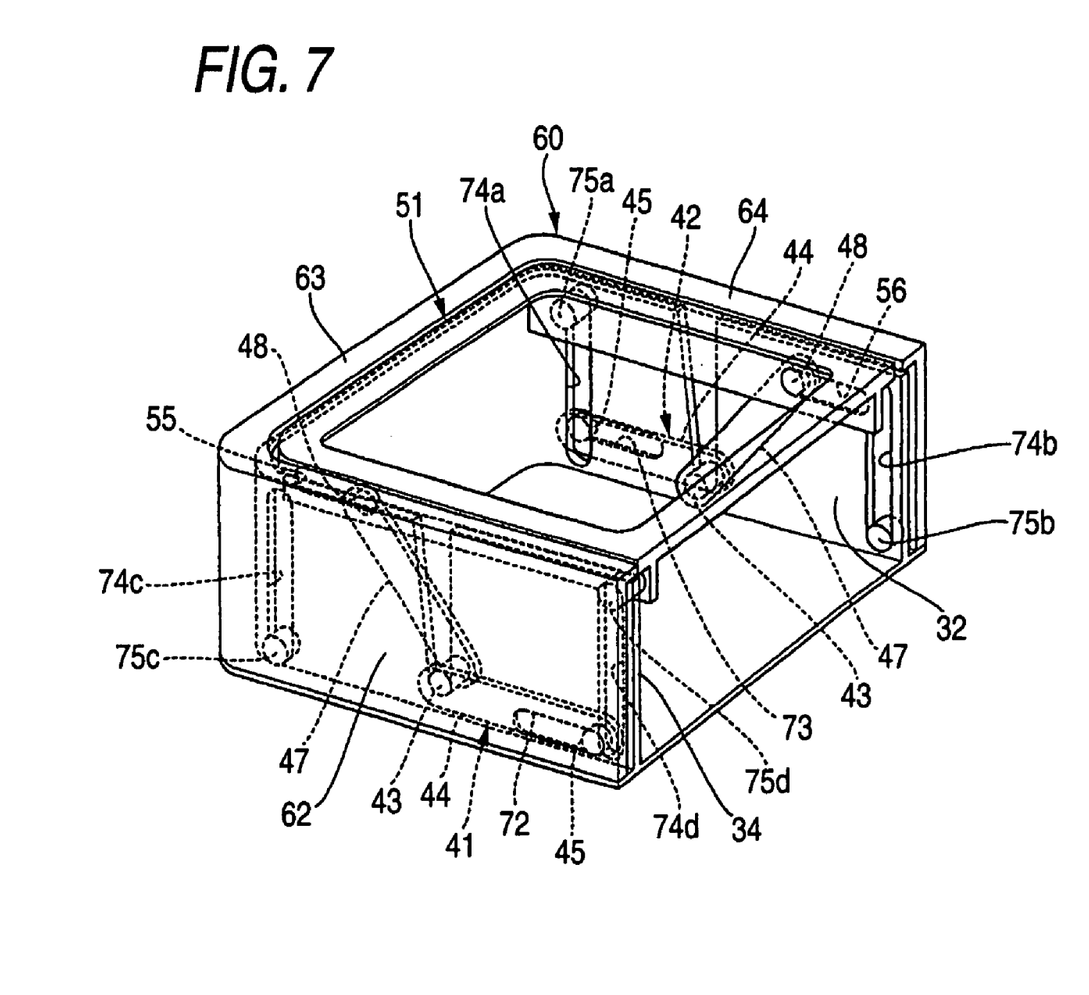
FIG. 7 is a perspective view showing a main part of the modified example to the automotive container holding apparatus according to the first embodiment of the invention, which shows a state in which a holding member is situated at a limit position for an upward movement thereof.
Figure 8:
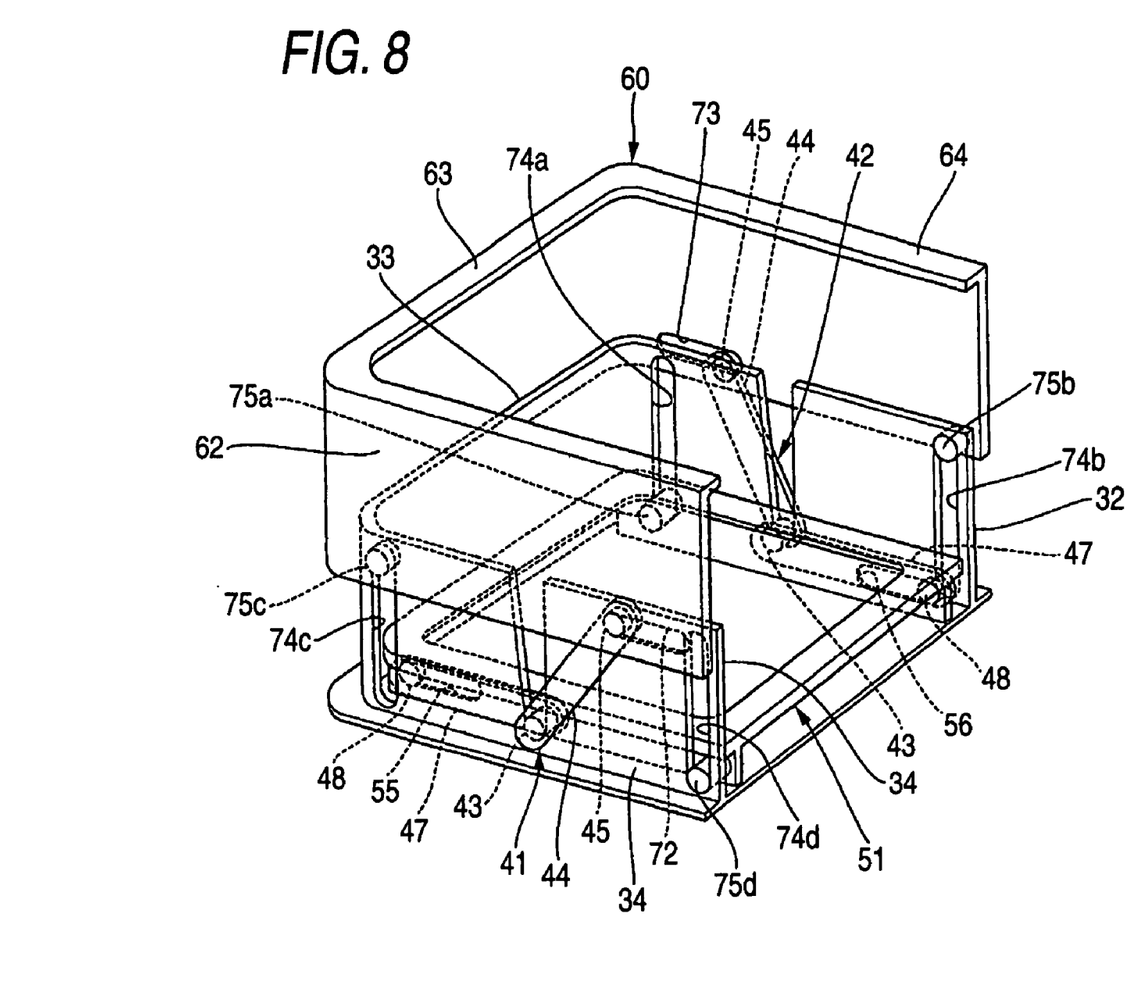
FIG. 8 is a perspective view showing the main part of the modified example to the automotive container holding apparatus according to the first embodiment of the invention, which shows a state in which the holding member is situated at a limit position for a downward movement thereof.

In addition, as shown in FIGS. 6 to 8, the recessed portions 25, the holding members 51 and the ascending and descending members 60 of the automotive container holding apparatus 14 of the first embodiment may be moved to contact one of the oppositely facing side wall portions of the console box portion 17 or the side wall portion 19 thereof so as to eliminate the erect wall portions 61 of the ascending and descending members 60 which are situated on the side to which the holding members 51 and the ascending and descending members 60 are moved closer and which the ascending and descending members 60 keep in the aforesaid construction, as well as the corresponding guide wall portions 31 which are close to the erect wall portions 61.

Namely, the recessed portions 25 and the holding members 51 are provided so as to be closer to the side wall portion 19 of the console box portion 17 which is formed into the shape of a recess which opens upwards in such a manner as to be farther away from the side wall portion 21 thereof which oppositely faces the side wall portion 19, and the ascending and descending members 60 which have only the erect wall portions 63 which are situated at the side of the side wall portion 21 and the erect wall portions 62, 64 which are situated on the sides of the erect wall portion 63 are provided in the recessed portions 25 for the holding portions 51 in the console box portion 17. Furthermore, the whole of the pairs of recessed portions 25, holding members 51 and ascending and descending members 60 are provided so as to be closer to the side wall portion 20 which intersects with the side wall portion 21 at right angles.

According to this configuration, when the holding member 51 is caused to move downwards, the ascending and descending member 60, which has the erect wall portion 63 that is provided at the side of the side wall portion 21 and the erect wall portions 62, 64 which are provided on the sides of the erect wall portion 63 for the holding portion 51, moves upwards, whereby there can be produced a state in which the drink container C can stably be held by the side wall portion 19 of the console box portion 17 and the erect wall portions 62 to 64. As this occurs, since the whole of the pairs of recessed portions 25, holding members 51 and ascending and descending members 60 are made to be closer to the side of the side wall portion 19, the side of the side wall portion 21 of the console box portion 17 which oppositely faces the side wall portion 19 can be used as a storing space for other articles than the drink container C. In addition, since the whole of the pairs of recessed portions 25, holding members 51 and ascending and descending members 60 are also made to be closer to the side wall portion 20, the side of the side wall portion 22 of the console box portion 17 which oppositely faces the side wall portion 20 can also be used as a storing space for other articles than the drink container C. A space between the ascending and descending members 60 are set such that operations are possible which allow the respective holding members 51 or the respective ascending and descending members 60 to function independently. In addition, in a state where no drink container is held, when the ascending and descending member 60 having the erect wall portions 62 to 64 is caused to move downwards, the whole of the console box portion 17 can widely be used as a storing space. In addition, since the side wall portion 19 of the console box portion 17 is used to hold the drink container C, the construction of the automotive container holding apparatus 14 can be simplified further, and moreover, the space that is maintained for the erect wall portion 61 in the previous configuration can be saved, so that the storing space for other articles than the drink container C can be expanded.

Note that while in the example shown in FIGS. 6 to 8, as opposed to the configuration discussed before then, the inner connecting arm 47 and the guide groove 55 of the connecting member 41 are provided on the side closer to the erect wall portion 63 and the outer connecting arm 44 and the guide groove 73 of the connecting member 42 are provided on the side closer to the erect wall portion 63, there is, of course, no difference in operation. In addition, while in the example shown in FIGS. 6 to 8, guide grooves 74a to 74d are formed on the guide wall portions 32, 34 on sides thereof which are closer to the guide wall portion and oppositely facing sides thereof in such a manner as to extend vertically, and pin portions 75a, 75d which are formed, respectively, on the guide wall portions 32, 34 on opposite sides to the guide grooves 55, 56 which are supported by the inner support shafts 48 of the connecting members 41, 42 of the holding member 51 are made to be guided within the corresponding guide grooves 74a, 74d, whereas pin portions 75b, 75c which are formed, respectively, on the guide wall portions 32, 34 on opposite sides to the guide grooves 72, 73 which are supported by the outer support shafts 45 of the connecting members 41, 42 of the ascending and descending member 60 are made to be guided within the corresponding guide grooves 74b, 74c.

An automotive container holding apparatus according to a second embodiment of the invention will be described below by reference to FIGS. 9 to 13.

Figure 9:
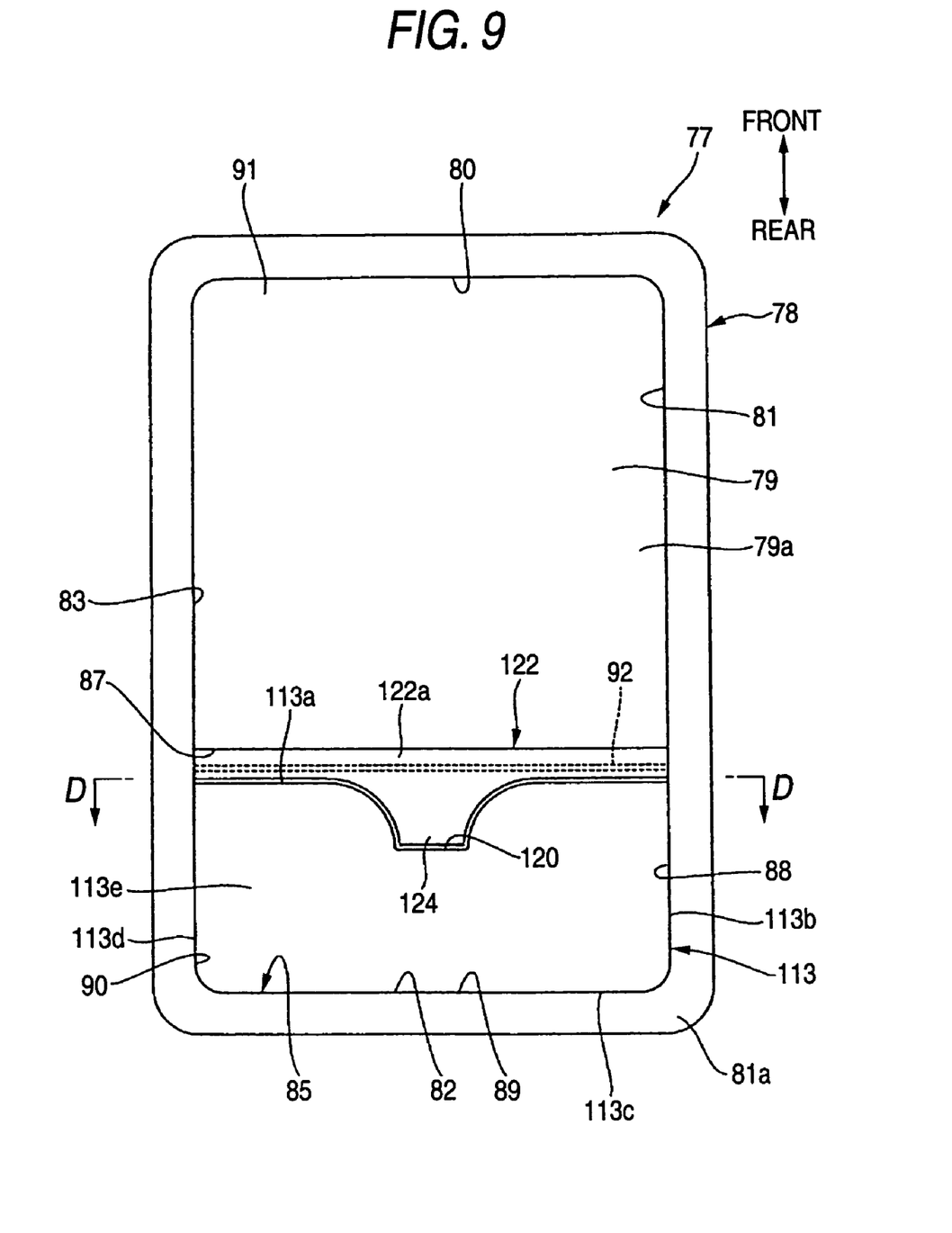
FIG. 9 is a plan view which shows an automotive container holding apparatus according to a second embodiment of the invention.

An automotive container holding apparatus 77 of the second embodiment has a console box portion (an article storing compartment) 78 which is formed substantially into a rectangular shape which is elongated in the longitudinal direction of the vehicle.

The console box portion 78 is formed into a recess which opens upwards and has a bottom portion 79 that is formed substantially into a longitudinally elongated, rectangular shape and which is disposed horizontally and four side wall portions 80 to 83 which rise from respective side edge portions of the bottom portion 79 and which are connected to each other in such a manner as to form a frame. In addition, a recessed portion 85 is formed at a location in the bottom portion 79 so as to be closer to one of the longitudinally oppositely facing side wall portions 80 of the console box portion 78, that is, to be specific, the side wall portion 82 in such a manner as to be farther away from the other of the longitudinally oppositely facing side wall portions, that is, to be specific, the side wall portion 80, and the recessed portion 85 is formed into a recess which recedes further downwards than an upper surface of the bottom portion 79, that is, a bottom surface 79a of the console box portion 78.

The recessed portion 85 has a bottom portion 86 that is formed substantially into a transversely elongated rectangular shape and which is disposed horizontally, four inner wall portions 87 to 90 which rise, respectively, from respective edge portions of the bottom portion 86 to a height level with the bottom surface 79a of the console box portion 78 and which are connected to each other in such a manner as to form a frame and a substantially flat plate-shaped guide wall portion 92 which rises from a longitudinal front side of the bottom portion 86 in parallel with the inner wall portion 87 that is situated on the same side, and the guide wall portion 92 connects to both of the inner wall portions 88, 90 which intersect with the guide wall portions 92 at right angles.

Note that the inner wall portion 88 which intersects with the guide wall portion 92 at right angles on one side thereof is formed by extending downwards the side wall portion 81 of the console box portion 78, the inner wall portion 90 which intersects with the guide wall portion 90 at right angles on one side thereof is also formed by extending downwards the side wall portion 83 of the console box portion 78, and the inner wall portion 89 which is farthest from the guide wall portion 92 is also formed by extending downwards the side wall portion 82 of the console box portion 78. Namely, the lower portion of the side wall portion, the lower portion of the side wall portion 82, and the lower portion of the side wall portion 83 constitute, respectively, the inner wall portion 88, the inner wall portion 89 and the inner wall portion 90.

Projecting portions 93 are formed at two locations of a lower portion of the guide wall portion 92 in such a manner as to project towards the inner wall portion 89 which is farthest away from the guide wall portion 92, and projecting portions 94 are formed at two locations of a lower portion of the inner wall portion 89 which is in parallel with the guide wall portion 92 in such a manner as to project towards the guide wall portion 92. Here, through holes 96 are formed in parallel with each other in the guide wall portion 92 on which the projecting portions 93 are formed at the two locations at the positions where the respective projecting portions 93 are actually formed, and through holes 97 are formed in the inner wall portion 89 on which the projecting portions 94 are formed at the two locations at the positions where the respective projecting portions 94 are actually formed in such a manner as to be coaxial with the corresponding through holes 96. Note that the height of the guide wall portion 92 is set lower than the bottom surface 79a of the console box portion 78.

The automotive container holding apparatus 77 has a pair of connecting members 99 which are rotatably supported at the respective through holes 96 in the guide wall portion 92. These connecting members 99 are formed into shapes which are symmetrical with each other in a mirror image fashion, and each of the connecting members 99 includes a rotational shaft 100 that is inserted into the corresponding through hole 96, an outer connecting arm 101 that is fixed to an axial outer end portion of the rotational shaft 100 at a proximal end portion thereof in such a state that the outer connecting arm 101 extends radially outwards from the rotational shaft 100, an outer support shaft 102 that is provided at a distal end portion of the outer connecting arm 101 which is opposite to the proximal end portion thereof where it is fixed to the rotational shaft 100 in such a manner as to extend further outwards along the rotational shaft 100, an inner connecting arm 103 that is fixed to an axial inner end portion of the rotational shaft 100 at a proximal end portion thereof in such a state that the inner connecting arm 103 extends radially outwards from the rotational shaft 100 and an inner support shaft 104 that is provided at a distal end portion of the inner connecting arm 103 which is opposite to the proximal end portion thereof where it is fixed to the rotational shaft 100 in such a manner as to extend further inwards along the rotational shaft 100.

Here, when viewed along an axial direction of the rotational shaft 100, each of the connecting members 99 is formed substantially into a V-shape by the outer connecting arm 101 and the inner connecting arm 103 which intersect with each other at an obtuse angle and is provided on the console box portion 78 in such a manner as to rotate about the rotational shaft that is provided at an intermediate portion where the connecting member 99 bends.

In addition, the automotive container holding apparatus 77 has a pair of support members 107 which are rotatably supported at the respective through holes 97 in the inner wall portion 89. Each of the support members 107 includes a rotational shaft 108 that is inserted into the corresponding through hole 97, a support arm 109 that is fixed to an axial inner end portion of the rotational shaft 108 at a proximal end portion thereof in such a state that the support arm 109 extends radially outwards from the axial inner end portion of the rotational shaft 108 and a support shaft 110 that is provided at a distal end portion of the support arm 109 which is opposite to the proximal end portion thereof where it is fixed to the rotational shaft 108 in such a manner as to extend further inwards along the rotational shaft 108. Namely, the support arm 109 is configured identical with the inner connecting arm 103 of the connecting member 99.

The automotive container holding apparatus 77 has a transversely elongated, substantially rectangular holding member (a holding portion) 113 that is horizontally disposed inside a portion in the recessed portion 85 which is surrounded by the guide wall portion 92, the inner wall portions 88, 90 at the lower portions of the side wall portions 81, 83 which are situated on the sides of the guide wall portion 92 in such a manner as to intersect therewith at right angles and the inner wall portion 89 at the lower portion of the side wall portion 82 which is farthest away from the guide wall portion 92 and which is connected to respective inner support shafts 104 at one end portions of the pair of connecting members 99 and respective support shafts 110 at distal end portions of the pair of support members 107. Namely, the holding member 113 is provided so as to be closer to one of the oppositely facing side wall portions of the console box portion 78 that is formed into the recess which opens upwards, that is, the side wall portion 82, in such a manner as to be farther away from the other of the oppositely facing side wall portions, that is, the side wall portion 80.

Figure 10:
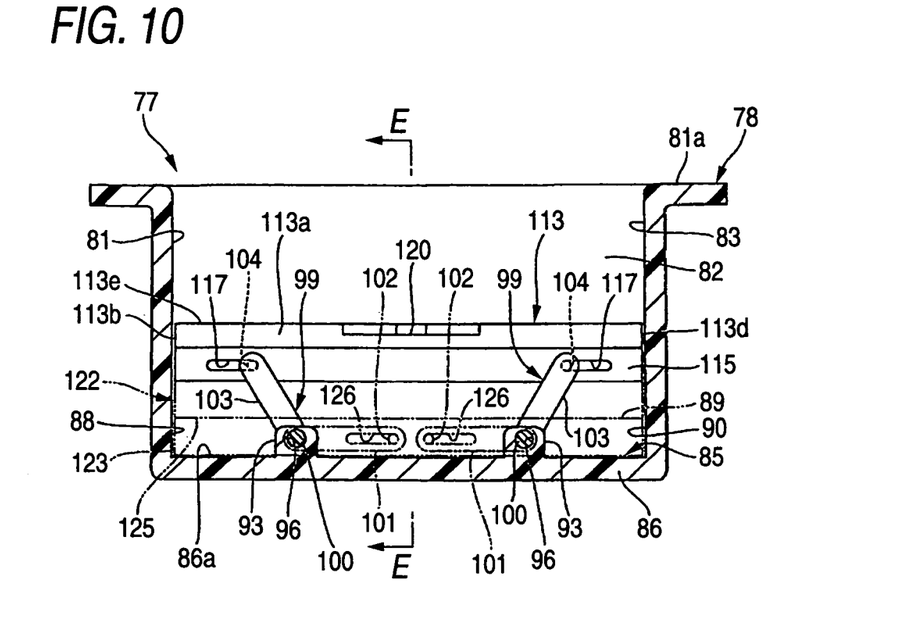
FIG. 10 is a sectional view taken along the line D-D in FIG. 9 showing the automotive container holding apparatus according to the second embodiment of the invention, which shows a state in which a holding member is situated at a limit position for an upward movement thereof.

Stepped portions 115, 116, which are both shaped such that a lower portion recedes further inwards than an upper portion, are formed, respectively, in side portions 113a, 113c of four side portions 113a to 113d of the holding member 113 which are situated at longer sides of the holding member 113 in such a manner as to extend along the full length of the respective side portions 113a, 113c, and as is shown in FIG. 10, a pair of guide grooves 117 are formed in the stepped portion 115 at positions which are spaced farther apart from each other in such a manner as to be arranged on the same straight line while extending horizontally. In addition, a pair of guide grooves 118 are formed in the stepped portion 116 at positions which are spaced farther apart from each other in such a manner as to be arranged on the same straight line while extending horizontally.

Then, the inner support shafts 104 of the pair of connecting members 99 are slidably inserted into the pair of guide grooves 117 in the side portion 113a of the holding member 113, whereas the support shafts 110 of the pair of support members 107 are slidably inserted into the pair of guide grooves 118 in the other side portion 113c of the holding member 113 which is opposite to the side portion 113a, and as a result, the holding member 113 is supported by the pair of connecting members 99 and the pair of support members 107.

Here, when the pair of connecting members 99 are put in such a state, as shown in FIG. 10, that the respective inner connecting arms 103 thereof extend obliquely upwards in opposite directions to each other from the rotational shafts 100, the respective inner support shafts 104 thereof come to be situated at end portions of the corresponding guide grooves 117 which are closest to each other, and when the pair of the support members 107 are also put in such a state that the respective support arms 109 thereof extend obliquely upwards in opposite directions each other from the rotational shafts 108, the respective support shafts 110 thereof come to be situated at end portions in the corresponding guide grooves 118 which are closest to each other.

Figure 12:
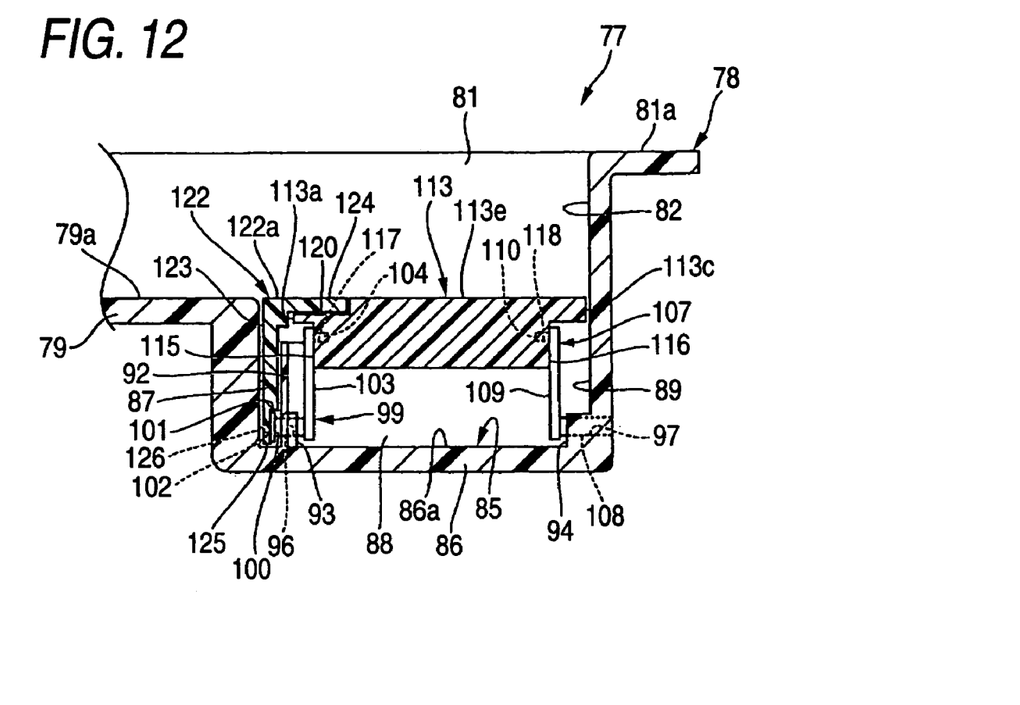
FIG. 12 is a sectional view taken along the line E-E of FIG. 10 which shows the automotive container holding apparatus according to the second embodiment of the invention.

As the aforesaid states are produced, the holding member 113, which is supported by the pair of inner support shafts 104 and the pair of support shafts 110, is situated at a limit position for an upward movement thereof, and as is shown in FIG. 12, an upper surface 113e of the holding member 113 becomes flush with the bottom surface 79a of the console box portion 78.

Figure 11:
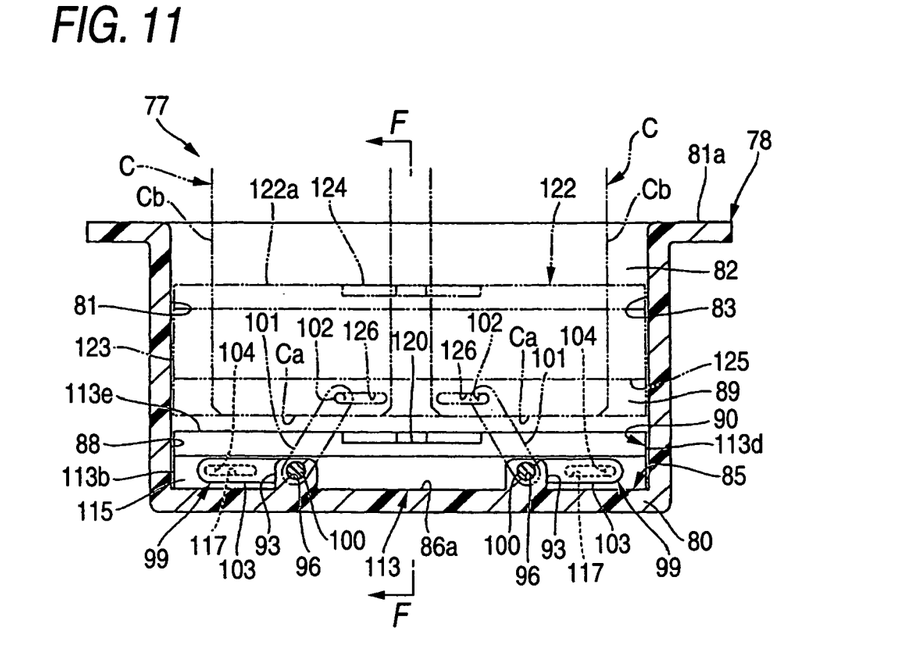
FIG. 11 is a sectional view taken along the line D-D in FIG. 9 showing the automotive container holding apparatus according to the second embodiment of the invention, which shows a state in which the holding member is situated at a limit position for a downward movement thereof.

On the other hand, as is shown in FIG. 11, when the pair of connecting members 99 are put in such a state that the respective inner connecting arms 103 thereof extend horizontally sideways in opposite directions to each other from the rotational shaft 100, the respective inner support shafts 104 thereof come to be situated at end portions in the corresponding guide grooves 117 which are farthest apart from each other, and when the pair of support members 107 are also put in such a state that the respective support arms 109 thereof extend horizontally sideways in opposite directions to each other from the rotational shafts 108, the respective support shafts 110 thereof come to be situated at end portions in the corresponding guide grooves 118 which are farthest apart from each other.

Figure 13:
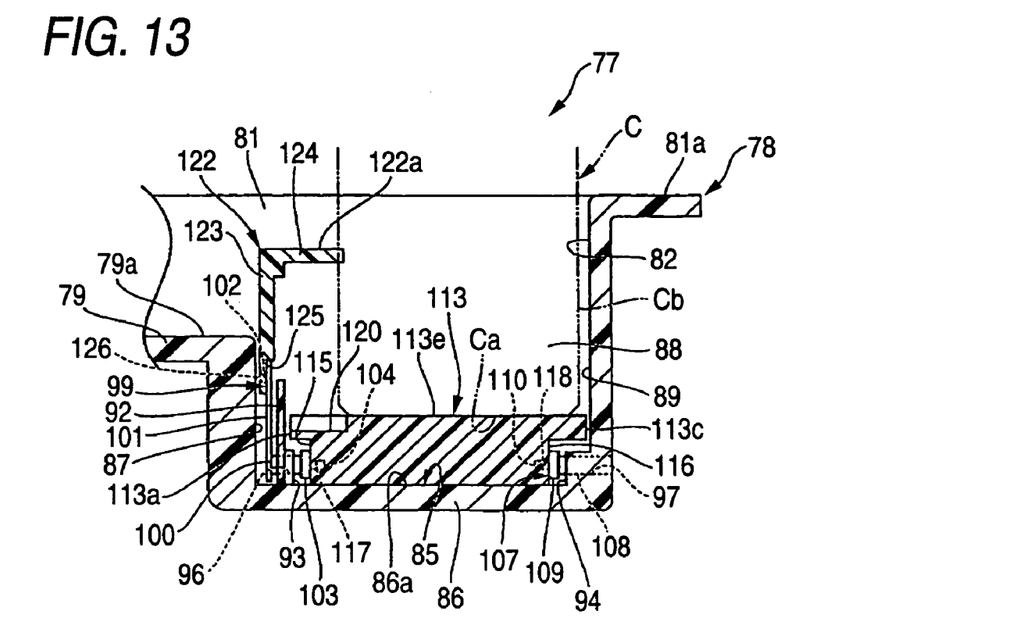
FIG. 13 is a sectional view taken along the line F-F of FIG. 11 which shows the automotive container holding apparatus according to the second embodiment of the invention.

As the aforesaid states are produced, the holding member 113, which is supported by the pair of inner support shafts 104 and the pair of support shafts 110, is situated at a limit position for a downward movement thereof, whereby the holding member 113 is, as shown in FIG. 13, superposed on an upper surface of the bottom portion 86 of the recessed portion 85 or an upper surface 86a of the recessed portion 85. Then, the holding member 113 is allowed to ascend and descend between the upper and lower limit positions. Namely, the holding member 113 is provided so as to move vertically.

An accommodating recessed portion 120 is formed in the upper surface 113e of the holding member 113 on a guide wall portion 92 side thereof in such a manner as to recede further downwards by a step than the upper surface 113e. This accommodating recessed portion 120 is formed into a shape in which a transversely central portion thereof is farthest apart from the guide wall portion 92 and sides thereof are formed into arcs, so that both the sides of the accommodating recessed portion 120 gradually approaches the guide wall portion 92.

The automotive container holding apparatus 77 has an ascending and descending member 122 which is inserted into a gap formed between the guide wall portion 92 and the inner wall portion 87 which is situated close and parallel to the guide wall portion 92. This ascending and descending member 122 has a substantially flat plate-shaped erect wall portion 123 and is disposed between the inner wall portion 87 and the guide wall portion 92 which are situated parallel and close to each other at this very erect wall portion 123. A holder portion 124 is formed at an upper edge portion of the erect portion 123 on the ascending and descending member 122 in such a manner as to project over the guide wall portion 92 into the inside of the recessed portion 85, and this holder portion 124 is formed into a complementary shape to the accommodating recessed portion 120 of the holding member 113. Namely, the holder portion 124 is formed into the shape in which the transversely central portion thereof is farthest apart from the erect wall portion 123 and the sides thereof are formed into arcs, so that both the sides of the accommodating recessed portion 120 gradually approaches the erect wall portion 123. Note that by adopting the configuration that has been described heretofore, the erect wall portion 123 is provided for the holding member 113 in the console box portion 78 at the side of the holding member 113 which faces the side wall portion 80.

Then, a recess-shaped stepped portion 125 is formed at a lower portion of the erect wall portion 123 on a guide wall portion 92 side thereof in such a manner as to extend along the full length of the erect wall portion 123, and a pair of guide grooves 126 are, as shown in FIG. 10, formed in the stepped portion 125 at positions nearest to each other thereon in such a manner as to be arranged on the same straight line while each extending in a horizontal direction. In the ascending and descending member 122, the outer support shaft 102 situated at the other end of one of the connecting members 99 is slidably inserted into one of the guide grooves 126, whereas the outer support shaft 104 situated at the other end of the other of the connecting members 99 is slidably inserted into the other of the guide grooves 126, and as a result, the ascending and descending member 122 is connected to the other ends of the pair of connecting members 99 at the erect wall portion 123 in which the guide grooves 126 are formed.

Here, as is shown in FIG. 11, when the pair of connecting members 99 are put in such a state that the respective outer connecting arms 101 extend from the rotational shafts 100 obliquely upwards in directions in which they approach each other, the respective outer support shafts 102 come to be situated at end positions in the corresponding guide grooves 126 which are farthest apart from each other. As this occurs, the ascending and descending member 122 which is supported by the pair of outer support shafts 102 is situated at a limit position for a downward movement thereof, and an upper surface 122a which continues from the erect wall portion 123 to the holder portion 124 is, as shown in FIG. 13, situated above the bottom surface 79a of the console box portion 78, whereby the ascending and descending member 122 constitutes a partitioning wall between the bottom surface 79a side and the holding member 113 side.

On the other hand, as shown in FIG. 10, the pair of the connecting members 99 are put in such a state that the respective outer connecting arms 101 extend from the rotational shafts 100 horizontally sideways in directions in which they approach each other, the respective outer support shafts 102 thereof are situated at end portions in the corresponding guide grooves 126 which are closest to each other, the respective outer support shafts 102 thereof come to be situated at a limit position for a downward movement thereof. Note that when situated at the limit position for the downward movement thereof, in the ascending and descending member 122, the erect wall portion 123 and the upper surface 122a of the holder portion 124 become flush with the bottom surface 79a of the console box portion 78. Then, the ascending and descending member 122 ascends and descends between the upper and lower limit positions. Namely, the ascending and descending member 122 having the erect wall portion 123 is provided in such a manner as to move in the vertical directions.

Here, since each of the connecting members 99 is, as has been described above, formed substantially into the V-shape and is provided on the console box portion 78 in such a manner as to rotate at the intermediate portion where the connecting member 99 is bent, when the inner support shaft 104 moves upwards, the outer support shaft 102 moves downwards in such a manner as to link with the upward movement of the inner support shaft 104, whereas when the inner support shaft 104 moves downwards, the outer support shaft 102 moves upwards in such a manner as to link with the downward movement of the inner support shaft 104. As a result, the ascending and descending member 122 having the erect wall portion 123 that is connected to the outer support shafts 102 moves upward in such a manner as to link with a downward movement of the holding member 113 that is connected to the inner support shafts 104, whereas the ascending and descending member 122 having the erect wall portion 123 that is connected to the outer support shafts 102 moves downward in such a manner as to link with an upward movement of the holding member 113 that is connected to the inner support shafts 104.

Then, when the holding member 113 moves downwards to the lower limit position thereof, the ascending and descending member 122 having the erect wall portion 123 moves upwards to the upper limit position thereof. In this state, the holding member 113 is situated below the bottom surface 79a of the console box portion 78, and the ascending and descending member 122 is situated above the bottom surface 79a of the console box portion 78. As this occurs, the upper surface 122a of the ascending and descending member 122 is situated at a height that is equal to or lower than an upper surface 81a of the console box portion 78, whereby the ascending and descending member 122 constitutes a partitioning wall between the bottom surface 79a side and the holding member 113 side.

In addition, when the holding member 113 moves upwards to the upper limit position thereof, the ascending and descending member 122 having the erect wall portion 123 moves downwards to the lower limit position thereof. In this state, the holder portion 124 of the ascending and descending member 122 comes to enter the accommodating recessed portion 120 in the holding member 113, whereby the upper surface 113e of the holding member 113, the erect wall portion 123 of the ascending and descending member 122 and the upper surface 122a of the holder portion 124 become flush with the bottom surface 79a of the console box portion 78.

Here, in a state where only the weights of the holding member 113 and the ascending and descending member 122 are exerted from the relationship between the weights of the holding member 113 and the ascending and descending member 122, the upper surface 113e of the holding member 113 and the upper surfaces 122a of the ascending and descending member 122 become flush with the bottom surface 79a of the console box portion 78, whereby the entirety of a bottom surface 18a side of the console box portion 78 becomes flat to thereby constitute a storing space where an article can be placed. Note that even when an article is placed there, in the event that the article is not placed on the holding member 113 in such a way that a load which is equal to or greater than a predetermined value is exerted only on the upper surface 113e of the holding member 113, the state is maintained in which the upper surface 113e of the holding member 113, the upper surface 122a of the ascending and descending member 122 and the bottom surface 79a of the console box portion 78 are flush with each other.

On the other hand, when a drink container (a container) C is placed on the holding member 113, a load that is equal to or greater than the predetermined value is exerted on the upper surface 113e of the holding member 113, whereby the holding member 113 descends until it stops at the limit position of the downward movement thereof, and linking with this downward movement of the holding member 113, the ascending and descending member 122 ascends until it stops at the limit position of the upward movement thereof. As a result, there is produced a state in which the a bottom Ca of the container C is held on the holding member 113 and the guide wall portion 92 of the recessed portion 85 which is situated above the holding member 113 which has so descended, the ascending and descending member 122 which continuously projects over the guide wall portion 92, the side wall portions 81, 83 which intersect with the guide wall portion 92 at right angles and the side wall portion 82 which oppositely faces the guide wall portion 92 oppositely face sides Cb of the drink container C to thereby restrict sideways movements of the drink container C. Here, since the holding member 113 is formed into the transversely elongated shape, two drink containers C can be held, and the holder portion 124 of the ascending and descending member 122 faces the sides of the respective drink containers C which are situated towards a transverse center of the holding member 113 to thereby restrict sideways movements of the respective drink containers C.

Similar advantages to those provided by the first embodiment can be provided by the automotive container holding apparatus 77 of the second embodiment that has been described heretofore, as well.

On top of that, when the holding member 113 is caused to move downwards which is provided so as to be closer to the one of the longitudinally oppositely facing side wall portions of the console box portion 78 which is formed into the recess which opens upwards, that is, the side wall portion 82 in such a manner as to be farther away from the other of the longitudinally oppositely facing side wall portions, that is, the side wall portion 80, the erect wall portion 123 moves upwards which is provided so as to be closer to the one of the oppositely facing side wall portions, that is, the side wall portion 80 for the holding member 113 in the console box portion 78, whereby there is produced a state in which the drink container C can be held by the other of the oppositely facing side wall portions, that is, the side wall portion 82, the side wall portions 81, 83 which intersect with the side wall portion 82 at right angles, the erect wall portion 123 and the holder portion 124. As this occurs, a portion of the console box portion 78 which extends longitudinally forward of the erect wall portion 123 to the other of the oppositely facing side wall portions, that is, the side wall portion 80 can be used as a storing space for other articles than the drink container C. In addition, in such a state that no drink container C is held, in the event that the erect wall portion 123 is caused to move downwards, the whole of the console box portion 78 can be used widely as a flat storing space. In addition, since the side wall portions 81 to 83 of the console box portion 78 are used to hold the drink container C, the construction of the automotive container holding apparatus 77 can be simplified further, and moreover, the spaces for erect wall portions that would otherwise be necessary can be saved so as to increase the storing space for other articles than drink containers C.

Note that also in the second embodiment, there may be provided a locking mechanism which is designed to lock the holding member 113 and the ascending and descending member 122 in such a manner as to prohibit the ascending and descending thereof when the holding member 113 comes to be situated at the limit position of the downward movement thereof while the ascending and descending member 122 comes to be situated at the limit position of the upward movement thereof and to release the holding member 113 and the ascending and descending member 122 which are so locked by pushing down the ascending and descending member 122 with a force of a predetermined value or greater. In addition, there may be provided a locking mechanism which is designed to lock the holding member 113 and the ascending and descending member 122 in such a manner as to prohibit the ascending and descending thereof when the holding member 51 comes to be situated at the limit position of the upward movement thereof while the ascending and descending member 60 comes to be situated at the limit position of the downward movement thereof and to release the holding member 113 and the ascending and descending member 122 which are so locked by pushing down the holding member 113 with a force of a predetermined value or greater. Furthermore, both of the locking mechanisms may be provided. In this case, the holding member may be biased by a spring or the like in a direction in which the holding member is situated at the limit position of the upward movement thereof.

What is claimed is:

1. An automotive container holding apparatus comprising:
   a holding portion which holds a bottom of a container, and
   erect wall portions which are provided at sides of the holding portion to face sides of the container, wherein
   the holding portion and the erect wall portions are provided to move vertically, and
   the erect wall portions move upwards while linking with a downward movement of the holding portion.

2. The automotive container holding apparatus as set forth in claim 1, wherein
   an upper surface of the holding portion becomes flush with upper surfaces of the erect wall portions in a state that the holding portion has moved upwards and the erect wall portions have moved downwards.

3. The automotive container holding apparatus as set forth in claim 1, further comprising:
   a substantially V-shaped connecting member that is provided in such a manner as to be connected to the holding portion at one end thereof and be connected to the erect wall portion at the other end thereof and to rotate at an intermediate portion thereof where the connecting member is bent.

4. The automotive container holding apparatus as set forth in claim 1, further comprising:
   a recess-shaped article storing compartment which opens upwards, wherein
   the holding portion is provided to be closer to one of oppositely facing side wall portions of the article storing compartment in such a manner as to be farther away from the other of the oppositely facing side wall portions, and the erect wall portion for the holding portion in the article storing compartment is provided at least at the side of the other of the oppositely facing side wall portions.

5. The automotive container holding apparatus as set forth in claim 1, further comprising:
   a connecting member which is substantially V-shaped to be supported rotatably at a bent intermediate portion thereof,
   a first support shaft provided at one end of the connecting member, and
   a second support shaft provided at the other end of the connecting member, wherein
   the first support shaft is slidably inserted into a first guide groove which is formed on the holding portion and horizontally extends, and
   the second support shaft is slidably inserted into a second guide groove which is formed on each of the erect wall portions and horizontally extends.

* * * * *